United States Patent
Hillen et al.

(10) Patent No.: US 10,876,482 B2
(45) Date of Patent: Dec. 29, 2020

(54) INTERNAL COMBUSTION ENGINE

(71) Applicant: INNIO Jenbacher GmbH & Co OG, Tiro (AT)

(72) Inventors: Friedhelm Hillen, Tirol (AT); Manfred Sieberer, Langkampfen (AT); Bhuvaneswaran Manickam, Ratteberg (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 147 days.

(21) Appl. No.: 15/750,424

(22) PCT Filed: Sep. 5, 2016

(86) PCT No.: PCT/EP2016/070841
§ 371 (c)(1),
(2) Date: Aug. 28, 2018

(87) PCT Pub. No.: WO2017/037286
PCT Pub. Date: Mar. 9, 2017

(65) Prior Publication Data
US 2019/0040803 A1 Feb. 7, 2019

(30) Foreign Application Priority Data
Sep. 4, 2015 (AT) .............. A 50756/2015

(51) Int. Cl.
*F02D 13/06* (2006.01)
*F01N 3/20* (2006.01)
(Continued)

(52) U.S. Cl.
CPC .............. *F02D 13/06* (2013.01); *F01N 3/10* (2013.01); *F01N 3/2033* (2013.01); *F01N 9/00* (2013.01);
(Continued)

(58) Field of Classification Search
CPC ........ F01N 3/2006; F01N 3/10; F01N 3/2033; F01N 3/2053; F01N 3/36; F01N 9/00;
(Continued)

(56) References Cited

U.S. PATENT DOCUMENTS

| 4,009,574 A | 3/1977 | Melchior |
| 5,410,876 A * | 5/1995 | Simko ................... F01N 3/2053 60/288 |

(Continued)

FOREIGN PATENT DOCUMENTS

| CN | 103782007 A1 | 5/2014 |
| CN | 104595012 A | 5/2015 |

(Continued)

OTHER PUBLICATIONS

Translation of DE 10139526, published Feb. 20, 2003.*

(Continued)

*Primary Examiner* — Mark A Laurenzi
*Assistant Examiner* — Mickey H France
(74) *Attorney, Agent, or Firm* — Fletcher Yoder, P.C.

(57) ABSTRACT

An internal combustion engine having: at least one piston-cylinder unit, a turbocharger having an exhaust gas turbine, a catalytic converter connected between the at least one piston-cylinder unit and the exhaust gas turbine, and a control device, wherein the control device is designed to control a fluid-delivery device such that, when the internal combustion engine is in a state in which no combustion and/or ignition takes place in the at least one piston-cylinder unit, the fluid-delivery device delivers fuel-air mixture through the catalytic converter.

26 Claims, 1 Drawing Sheet

(51) Int. Cl.
| | |
|---|---|
| *F02D 41/00* | (2006.01) |
| *F02D 41/02* | (2006.01) |
| *F02B 39/10* | (2006.01) |
| *F02D 41/04* | (2006.01) |
| *F01N 3/10* | (2006.01) |
| *F01N 9/00* | (2006.01) |
| *F02B 37/10* | (2006.01) |
| *F02B 37/12* | (2006.01) |

(52) U.S. Cl.
CPC ............. *F02B 37/10* (2013.01); *F02B 37/12* (2013.01); *F02B 39/10* (2013.01); *F02D 41/0007* (2013.01); *F02D 41/025* (2013.01); *F02D 41/042* (2013.01); *F01N 2240/16* (2013.01); *Y02T 10/12* (2013.01)

(58) Field of Classification Search
CPC .......... F01N 5/00; F01N 5/02; F01N 2610/03; F01N 2240/16; F02B 37/10; F02B 37/11; F02B 37/20; F02B 37/12; F02B 51/02; F02B 39/10; F02D 41/025; F02D 41/042; F02D 41/0007; Y02T 10/26; Y02T 10/144
USPC ......... 60/280, 284, 286, 300, 303, 320, 598, 60/605.1, 602, 603, 606, 607, 608, 614, 60/615
See application file for complete search history.

(56) References Cited

U.S. PATENT DOCUMENTS

| | | | | |
|---|---|---|---|---|
| 6,089,211 | A * | 7/2000 | Wenger ................ | F01N 3/28 123/559.2 |
| 6,325,054 | B1 * | 12/2001 | Wenger ................ | F01N 3/2006 123/559.2 |
| 2005/0121009 | A1 * | 6/2005 | Flowers .............. | F02B 29/0412 123/568.15 |
| 2006/0123784 | A1 | 6/2006 | Algrain | |
| 2007/0062189 | A1 * | 3/2007 | Keppeler ............. | F01N 3/0807 60/605.1 |
| 2008/0078172 | A1 * | 4/2008 | Miller .................. | F01N 3/2033 60/303 |
| 2009/0025371 | A1 * | 1/2009 | Hermansson ......... | B60K 6/445 60/286 |
| 2009/0145114 | A1 * | 6/2009 | Sato ....................... | C01C 1/086 60/286 |
| 2010/0005791 | A1 * | 1/2010 | Ranganathan ........... | F01N 3/36 60/310 |
| 2010/0211293 | A1 * | 8/2010 | Yamada ............. | F02D 41/0007 701/108 |
| 2010/0275584 | A1 * | 11/2010 | Wada .................. | B01J 37/0225 60/285 |
| 2010/0293926 | A1 * | 11/2010 | Perry ................. | B01F 3/04049 60/286 |
| 2012/0117962 | A1 | 5/2012 | VanDyne et al. | |
| 2012/0137660 | A1 * | 6/2012 | Yan ........................ | F01N 3/206 60/276 |
| 2012/0279218 | A1 * | 11/2012 | Ishida ................... | F01K 23/065 60/611 |
| 2012/0301365 | A1 * | 11/2012 | Hanada ................ | F01N 3/0821 422/173 |
| 2013/0081600 | A1 * | 4/2013 | Fukui ................... | F02D 41/0042 123/520 |
| 2013/0186071 | A1 * | 7/2013 | Mori ....................... | F01N 13/02 60/274 |
| 2013/0263579 | A1 * | 10/2013 | Takeuchi .............. | F02B 37/007 60/274 |
| 2013/0276437 | A1 * | 10/2013 | Iwasaki ................ | F01N 3/0256 60/303 |
| 2013/0276438 | A1 * | 10/2013 | De Rudder ............ | F01N 3/035 60/324 |
| 2014/0007562 | A1 * | 1/2014 | Justin ................ | B01D 53/9454 60/297 |
| 2014/0026545 | A1 * | 1/2014 | Mori ........................ | F01N 3/36 60/286 |
| 2014/0318111 | A1 * | 10/2014 | Richey ..................... | F01N 3/36 60/324 |
| 2014/0369890 | A1 * | 12/2014 | Hirabayashi ........... | C01B 3/382 422/109 |
| 2015/0075492 | A1 * | 3/2015 | Glugla ................. | F02D 41/0027 123/349 |
| 2015/0108384 | A1 * | 4/2015 | Reeves ................... | F01N 3/103 251/305 |
| 2016/0017779 | A1 * | 1/2016 | Hillen ................... | F01N 13/107 60/299 |
| 2016/0160773 | A1 * | 6/2016 | Qi ............................ | F01N 3/106 60/276 |
| 2018/0038254 | A1 * | 2/2018 | Nakada .................... | F02D 9/02 |

FOREIGN PATENT DOCUMENTS

| | | |
|---|---|---|
| DE | 4139291 A1 | 6/1993 |
| DE | 101 39 526 A1 | 2/2003 |
| DE | 103 27 686 A1 | 1/2005 |
| DE | 10 2006 037 649 A1 | 2/2008 |
| EP | 2 006 178 A1 | 12/2008 |
| EP | 2 578 866 A1 | 4/2013 |
| JP | 2008-38736 A | 2/2008 |
| WO | 2005/093235 A1 | 10/2005 |

OTHER PUBLICATIONS

Office Action issued in connection with corresponding AT Application No. A50756/2015 dated Jul. 18, 2016.
International Search Report and Written Opinion issued in connection with corresponding PCT Application No. PCT/EP2016/070841 dated Dec. 13, 2016.
Chinese Office Action for CN Application No. 201680051008.8 dated May 21, 2020; 16 pgs.

* cited by examiner

INTERNAL COMBUSTION ENGINE

TECHNOLOGY FIELD

This disclosure relates to an internal combustion engine and a method for preparing a starting operation of an internal combustion engine.

BACKGROUND

It is known that a catalytic converter can be arranged between the piston-cylinder units and the exhaust-gas turbine of a turbocharger. This has the advantage, in particular for large-volume gas engines, that it is possible to improve the efficiency of the turbocharger. The release of chemical energy which is still stored in the discharged material flow after combustion in the piston-cylinder units leads to a higher temperature of the material flow and an expansion of the material flow, resulting in a higher volume flow in the exhaust-gas turbine of the turbocharger. The turbocharger compressor driven by the exhaust-gas turbine can thus cause a higher charge-air pressure, whereby higher overall performance of the internal combustion engine can be achieved.

It should be noted that the enthalpy contained in the discharged material flow can be increased by shifting the ignition times of the piston-cylinder units appropriately or by supplying fuel to the material flow.

A disadvantage of the catalytic converter being in front of the exhaust-gas turbine is that degraded starting behavior occurs. This is because the energy released during starting in the catalytic converter will initially at least partially flow into a warming of the catalytic converter, which can extend the time required to reach the operating point of the internal combustion engine.

This disclosure provides an internal combustion engine and a method whereby improved starting behavior is achieved in the internal combustion engine.

With regard to the internal combustion engine, this is achieved by the features of claim 1.

This occurs with a control device designed to regulate a fluid-delivery device such that, in a state of the internal combustion engine in which no combustion and/or ignition occurs in the at least one piston-cylinder unit, the fluid-delivery device conveys the fuel-air mixture through the catalytic converter.

With regard to the method, this is achieved by the features of claim 16. In this case, in a state of the internal combustion engine, in which no combustion is performed, a catalytic converter of the internal combustion engine is preheated and/or kept warm by a fuel-air mixture conveyed through the catalytic converter.

By conveying a fuel-air mixture through the catalytic converter during idle phases, heat is generated in the same by releasing the enthalpy of the fuel-air mixture, which heats the catalytic converter. If the internal combustion engine is then started, the positive effect of the catalytic converter on the exhaust-gas turbine is immediate, since less energy is lost for heating the surroundings (i.e. the catalytic converter). As a result, the turbocharger responds more quickly, which improves the load behavior.

The term load behavior refers to the part of the starting process in which the power of the internal combustion engine is increased (load ramp) after a desired setpoint speed has been reached.

The measured values of temperature sensors can be used as feedback variables for the control device, whereby the temperature sensors can be arranged in front of or behind the catalytic converter or inside the catalytic converter. To further improve the control behavior, other variables such as pressure losses, valve openings, etc. can be processed in the control model motor-specifically.

The disclosure can in an embodiment be used in stationary motors and marine applications. It can be used in particular in gas engines, which preferably drive a generator for power generation (so-called gensets). The disclosure can be used in internal combustion engines with 8, 10, 12, 14, 16, 18, 20, 22 or 24 or more cylinders.

Embodiments of the disclosure are defined in the dependent claims.

The fluid-delivery device can be formed from a compressor of the turbocharger itself, in which case a motor can be provided to drive the compressor. This is particularly simple in structural terms, since the compressor already exists in many cases and only the engine must be added if necessary.

In addition, it can represent a particularly simple solution when an output of the engine is connected to a common shaft of the exhaust-gas turbine and the compressor of the turbocharger. The motor can be connected by means of a coupling or to the shaft directly. The motor can be electrical and is in an embodiment able to be operated as a generator. This opens up several possibilities. First, electricity can also be generated during operation by the turbocharger itself (similar to the turbocharger compound). Second, the electrical motor can be used to increase the charge-air pressure if necessary.

However, the fluid-delivery device can also be designed as at least one fan, in an embodiment connected upstream of a compressor of the turbocharger and/or downstream of the exhaust-gas turbine. As a result, no structural changes must be made to the turbocharger. It should be noted that both a fan upstream of the compressor of the turbocharger and a fan downstream of the exhaust-gas turbine can be used. A fan downstream of the exhaust-gas turbine can in an embodiment be designed to be corrosion-resistant, since the dewpoint of the motor exhaust gas is often such that condensation moisture is formed. Of course, the combination of two appropriately arranged fans can be provided.

The fuel-air mixture can in an embodiment be generated in a preferably controlled or regulated mixing device.

Particularly preferably, the mixing device can be arranged in terms of flow between the at least one piston-cylinder unit and the catalytic converter.

As a result, the enthalpy of the fuel-air mixture conveyed by the catalytic converter can be influenced in a particularly simple and targeted way.

Of course, the fuel-air mixture can also be generated in other ways. For this purpose, on the one hand, the mixing device can simply be one that generates the mixture for the piston-cylinder units. Such a mixing device can be designed and arranged in such a way that the mixture is already present before it enters the compressor (mixture-charged engines). On the other hand, controlled or regulated valves on the piston-cylinder units themselves or in a supply line to them can also be used (air-charged engines).

However, the fluid-delivery device can also be formed from the at least one piston-cylinder unit. In this case, the internal combustion engine can be cranked by a starting device or a generator (actually to be driven) in order to produce a fluid flow with a forced direction.

In such an embodiment, it can be that the mixing device is formed from a device designed for producing a fuel-air mixture for combustion in the at least one piston-cylinder unit. As a result, no additional mixing device needs to be installed, resulting in a particularly simple design.

In order to reduce the resistance caused by the internal combustion engine when conveying the fuel-air mixture through the catalytic converter, a bypass line can be provided for bypassing the at least one piston-cylinder unit, which is connected in terms of flow to a supply line for air or fuel-air mixture to the at least one piston-cylinder unit and a connecting line between the at least one piston-cylinder unit and the catalytic converter. This is particularly in internal combustion engines with a rather smaller number of piston-cylinder units, since it is then less likely that the intake and exhaust valves of a piston-cylinder unit are open at the same time and thereby the case can occur that no material flow can pass through the at least one piston-cylinder unit.

To prevent a material flow from passing through the bypass line during the combustion operation of the internal combustion engine, a shut-off valve can be provided in the bypass line.

In a particularly preferred embodiment, the mixing device can be arranged in the connecting line and the connection of the bypass line to the connecting line can be arranged before the mixing device in terms of flow. In this case, the admixture proportion of fuel to air can be controlled or regulated particularly well.

It can be provided that the control device activates the fluid-delivery device before starting or intermittently during the idle phases of the internal combustion engine.

For a particularly simple implementation of a method according to the disclosure, the controllable or regulatable mixing device is connected to the control device and is controlled or regulated by the latter so that the mixing device produces the fuel-air mixture when the fluid-delivery device is activated.

The shut-off valve can also be closed and, in the switched-off state, opened, in an embodiment by the control device.

The catalytic converter can have a in an embodiment electrical trace heating (also idle heating). In this case, at least one shut-off valve can be used to prevent cooling air flows through the catalytic converter and the other exhaust tract.

It can also be provided to use electrically heatable catalytic converter elements which allow heating of the catalytic converter "from the inside", so to speak. In particular, together with the conveyance of fuel-air mixture through the catalytic converter according to the disclosure, even in more strongly cooled systems, corresponding temperatures can thus be achieved in the catalytic converter without simultaneously overheating the catalytic converter locally.

BRIEF DESCRIPTION OF THE DRAWINGS

Further advantages and details of the disclosure can be found in the figures and the related descriptions of the figures. They are as follows:

FIG. 1 and FIG. 2 show various embodiments of an internal combustion engine according to the disclosure in schematic representations. The basic mode of operation of the underlying internal combustion engine is the same. This basic mode of operation is briefly described below:

DETAILED DESCRIPTION

Figure 1:
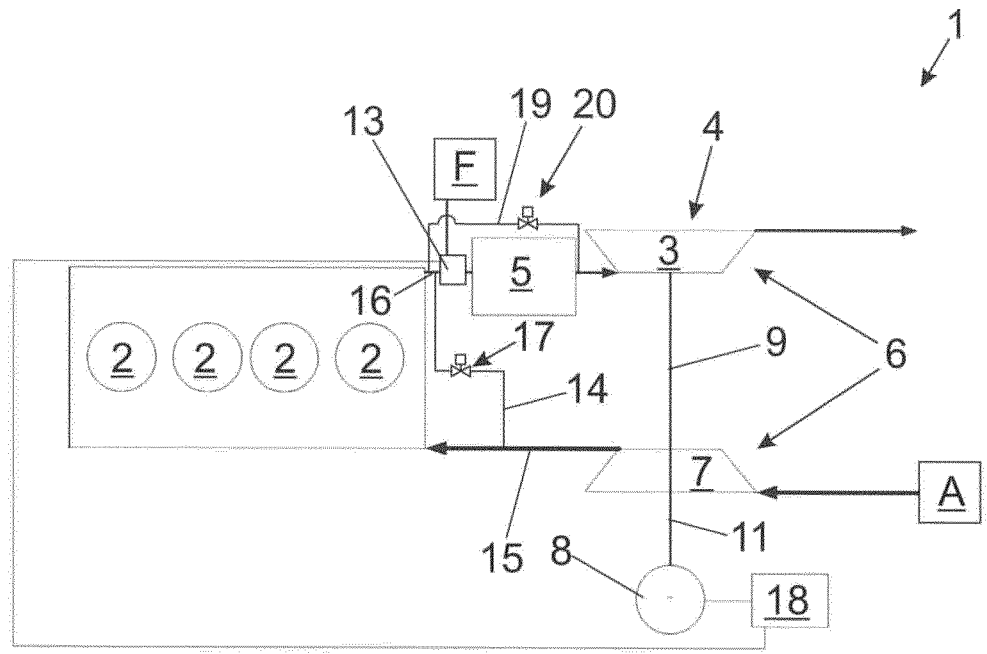
FIG. 1 shows schematically an internal combustion engine according to the disclosure with a compressor of a turbocharger as a fluid-delivery device.

Air A (generally ambient air) is sucked in and compressed in a compressor 7 of the turbocharger 4. Via the supply line 15, the compressed masses enter the piston-cylinder units 2, whereby, in this case, only four piston-cylinder units 2 are shown by way of example. Of course, for the combustion in the piston-cylinder units 2, a fuel-air mixture (in addition to the fuel-air mixture conveyed through the catalytic converter in a switched-off state of the internal combustion engine) must also be provided. This can be achieved either by a gas mixer (not shown) upstream of the compressor 7 (mixture-charged engine), or the gas mixer can be arranged in the supply line 15 (air-charged engine). Alternatively or additionally, controlled or regulated fuel introduction devices can be used directly in the piston-cylinder units 2.

After combustion in the piston-cylinder units 2, the material content is removed from the piston-cylinder units 2 and conveyed via a connecting line 16 into the catalytic converter 5. After flowing through the catalytic converter 5, the material flow reaches the exhaust-gas turbine 3 of the turbocharger 4 and finally exits as exhaust gas. The exhaust-gas turbine 3 is connected via a common shaft 9 to the compressor 7 of the turbocharger 4, such that the exhaust-gas turbine 3 drives the compressor 7 to generate the charge-air pressure.

The two embodiments represented also comprise a mixing device 13. Via this mixing device 13, to the air flow generated by the fluid-delivery device 6, fuel F is added from a fuel reservoir (generally a tank) or from the fuel supply of the internal combustion engine 1 (not shown); and the fuel-air mixture is created, which is then conveyed through the catalytic converter 5.

Figure 2:
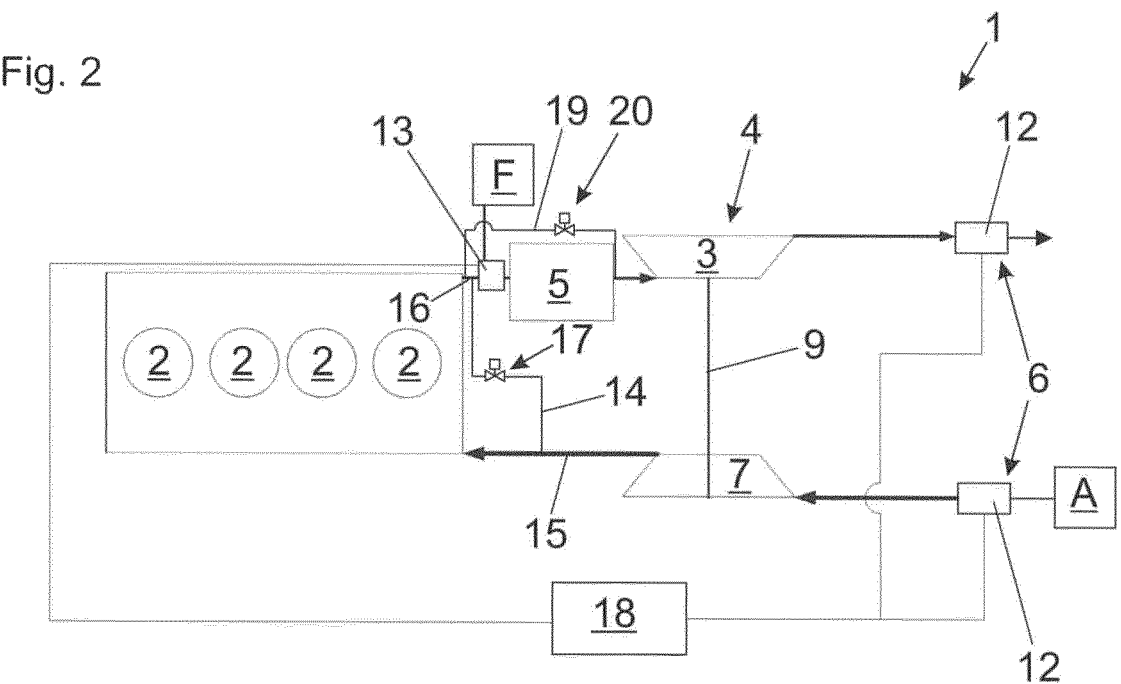
FIG. 2 shows schematically an internal combustion engine according to the disclosure with two alternative arrangements of a fan as a fluid-delivery device.

Also common to both representations of FIG. 1 and FIG. 2 is the bypass line 14, which connects the supply line 15 to the connecting line 16. However, this bypass line 14 is not absolutely necessary, since the air can also be conveyed to the catalytic converter by piston-cylinder units 2.

It should also be noted that the mixing device 13 does not need to be arranged exclusively at the drawn position. For example, it could also be arranged upstream in the supply line 15, in the bypass line 14 or in the compressor 7. Finally, it is also possible to refrain from using a separate mixing device 13. It is also possible to use a device that serves to produce the fuel-air mixture for combustion in the piston-cylinder units 2.

In the bypass line 14, a shut-off valve 17 can in an embodiment be provided. This can be shut off during operation so that no direct material flow occurs between the supply line 15 and the connecting line 16.

In both embodiments, a catalytic converter bypass line 19 is also provided, in which a valve 20 is also in an embodiment arranged.

Via the catalytic converter bypass line 19 around the catalytic converter 5 and the mixing device 13, which opens again in front of the exhaust-gas turbine 3 of the turbocharger 4, and the valve 20, the temperature in the exhaust-gas system after the catalytic converter 5 can additionally be regulated (e.g. by means of temperature sensors in/after the junction) to prevent temperature spikes for the turbocharger and downstream components of the exhaust tract. In addition, this system can prevent or at least reduce the cooling of any downstream SCR. (SCR or selective catalytic reduction refers to a catalytic converter in which catalytic reactions are performed for the selective reduction of certain emissions, generally nitrogen oxides, by the prior admixture of a reducing agent, generally an aqueous urea solution, to the exhaust-gas material flow.)

In the specific embodiment of FIG. 1, the fluid-delivery device 6 is formed from the compressor 7 in conjunction with the motor 8, which in this case is electrical, whereby the output 11 of the motor 8 is connected to the common shaft 9 of the turbocharger 4. If the internal combustion engine 1 is switched off, air can first be conveyed through the bypass line 14 and the piston-cylinder units 2 by means of the compressor 7 driven by the motor 8. As described above, by the addition of fuel, the mixing device 13 then generates the fuel-air mixture, which is conveyed through the catalytic converter 5. Heat is generated by the catalytic reaction in the catalytic converter 5, whereby the catalytic converter 5 is preheated before starting the internal combustion engine 1. When the internal combustion engine is started, the full enthalpy of the material flow removed from the piston-cylinder units 2 can then be used to improve the efficiency of the exhaust-gas turbine 3.

A control or regulating device 18 is provided, which is firstly connected to the motor 8 and secondly to the mixing device 13. This control or regulating device 18 takes over the control through the described heating process. For the sake of clarity, the additional connection between the control or regulating device 18 and the shut-off valve 17 and the valve 20 is not shown. The control or regulating device 18 can open the shut-off valve 17 in the switched-off state of the internal combustion engine 1, whereby the bypass line 14 can serve the described purpose. During operation, the control or regulating device 18 can then close the shut-off valve 17.

The above-described regulation or control of the valve 20 can also be performed by the regulating device 18.

Both the shut-off valve 17 and the valve 20 can each be designed as a non-return valve, which completely prevents the passage of a material flow, or as a volume-flow regulating valve or the like.

FIG. 2 shows two alternative arrangements of a fan 12, which is designed separately from the turbocharger 4. In this case, the fan 12 forms the fluid-delivery device 6, for which reason the fan is connected to the control or regulating device 18 for this purpose.

In addition to the arrangement in terms of flow in front of the compressor 7 or after the exhaust-gas turbine 3, an embodiment with two fans 12 can of course be used, which are arranged as shown in FIG. 2.

An arrangement of a fan 12 in the supply line 15 and/or the connecting line 16 is of course possible in principle. Finally, a combination of the compressor 7 and a fan 12 or a plurality of fans 12 can also be used as the fluid-delivery device 6.

As already mentioned, the piston-cylinder units themselves can also form the fluid-delivery device 6, whereby the installation of a motor 8 connected to the shaft 9 or one or a plurality of fans 12 can be avoided. As a mixing device 13, for example, a gas mixer or another device for generating the fuel-air mixture for combustion in the piston-cylinder units 2 can be used.

A further advantage of a fluid-delivery device according to the disclosure for conveying a fuel-air mixture through the catalytic converter 5 is that, in the switched-off state of the internal combustion engine 1, the exhaust tract and optionally the piston-cylinder units 2 can have the fuel-air mixture pumped out of them (so-called "purging"). This can be done after a normal shutdown of operation of the internal combustion engine 1 or after a failed start attempt.

What we claim is:

1. An internal combustion engine comprising:
   at least one piston-cylinder unit;
   an exhaust flow path coupled to an exhaust outlet of the at least one piston-cylinder unit;
   a turbocharger having an exhaust-gas turbine disposed along the exhaust flow path;
   a catalytic converter disposed along the exhaust flow path between the at least one piston-cylinder unit and the exhaust-gas turbine, wherein the catalytic converter is configured to reduce pollutant emissions in an exhaust gas generated by the at least one piston-cylinder unit;
   a fluid-delivery device fluidly coupled to the exhaust flow path, wherein the fluid-delivery device comprises at least one of: a compressor of the turbocharger with a motor configured to drive the compressor during an idle state, an upstream fan positioned upstream of a compressor of the turbocharger, and/or a downstream fan positioned downstream of the exhaust-gas turbine; and
   a control device;
   wherein the control device is designed to regulate the fluid-delivery device such that, in the idle state of the internal combustion engine in which no combustion and/or ignition occurs in the at least one piston-cylinder unit, the fluid-delivery device conveys a fuel-air mixture through the catalytic converter to cause a catalytic reaction that heats the catalytic converter to improve a subsequent starting operation of the internal combustion engine.

2. The internal combustion engine according to claim 1, wherein the fluid-delivery device comprises the compressor of the turbocharger with the motor configured to drive the compressor during the idle state.

3. The internal combustion engine according to claim 2, wherein an output of the motor is connected with a common shaft to the exhaust-gas turbine and the compressor of the turbocharger, wherein the control device is configured to operate the motor to drive the compressor during the idle state while the exhaust-gas turbine is not driven by an exhaust gas flow.

4. The internal combustion engine according to claim 2, wherein the motor is electrical and operable as a generator.

5. The internal combustion engine according to claim 1, wherein the fluid-delivery device comprises the upstream fan positioned upstream of the compressor of the turbocharger and/or the downstream fan positioned downstream of the exhaust-gas turbine.

6. The internal combustion engine according to claim 1, further comprising a controllable or regulatable mixing device operable to produce the fuel-air mixture.

7. The internal combustion engine according to claim 6, wherein the mixing device is fluidly coupled to the exhaust flow path between the at least one piston-cylinder unit and the catalytic converter.

8. The internal combustion engine according to claim 6, wherein the mixing device is connected to and controlled or regulated by the control device for mixing device production of the fuel-air mixture when the fluid-delivery device is activated.

9. The internal combustion engine according to claim 6, wherein the mixing device is connected to a fuel supply with a fuel reservoir and/or a supply line for the internal combustion engine.

10. The internal combustion engine according to claim 1, wherein a bypass line is provided for bypassing the at least one piston-cylinder unit, which is connected in terms of flow to a supply line for air or fuel-air mixture to the at least one piston-cylinder unit and a connecting line between the at least one piston-cylinder unit and the catalytic converter.

11. The internal combustion engine according to claim 6, wherein the mixing device is arranged in a connecting line and connection of a bypass line to the connecting line is arranged before the mixing device in terms of flow.

12. The internal combustion engine according to claim 10, wherein a shut-off valve is provided in the bypass line.

13. The internal combustion engine according to claim 1, wherein the control device is configured to reduce a cooling flow for the catalytic converter during the idle state.

14. The internal combustion engine according to claim 1, comprising a selective catalytic reduction (SCR) system disposed along the exhaust flow path, wherein the control device is configured to reduce cooling of the SCR system during the idle state.

15. The internal combustion engine according to claim 1, wherein the catalytic converter has electrical trace heating configured to heat the catalytic converter during the idle state of the internal combustion engine.

16. A method, comprising:
supplying a fuel-air mixture to an exhaust flow path between at least one piston-cylinder unit and a catalytic converter of an internal combustion engine during an idle state of the internal combustion engine in which no combustion and/or ignition occurs in the at least one piston-cylinder unit, wherein supplying the fuel-air mixture comprises inducing a flow of the fuel-air mixture through the catalytic converter with at least one of: a compressor of a turbocharger with a motor configured to drive the compressor during the idle state, an upstream fan positioned upstream of the compressor of the turbocharger, and/or a downstream fan positioned downstream of an exhaust-gas turbine of the turbocharger; and
heating the catalytic converter via a catalytic reaction with the fuel-air mixture during the idle state to improve a subsequent starting operation of the internal combustion engine, wherein the catalytic converter is configured to reduce pollutant emissions in an exhaust gas generated by the at least one piston-cylinder unit.

17. The method according to claim 16, wherein the fuel-air mixture is conveyed through the catalytic converter intermittently during the idle state of the internal combustion engine.

18. A system, comprising:
a catalytic converter configured to be disposed along an exhaust flow path between at least one piston-cylinder unit and an exhaust-gas turbine of an internal combustion engine, wherein the catalytic converter is configured to reduce pollutant emissions in an exhaust gas generated by the at least one piston-cylinder unit;
a fluid-delivery device configured to be fluidly coupled to the exhaust flow path, wherein the fluid-delivery device comprises at least one of: a compressor of a turbocharger with a motor configured to drive the compressor during an idle state, an upstream fan positioned upstream of the compressor of the turbocharger, and/or a downstream fan positioned downstream of the exhaust-gas turbine; and
a control device;
wherein the control device is designed to regulate the fluid-delivery device such that, in the idle state of the internal combustion engine in which no combustion and/or ignition occurs in the at least one piston-cylinder unit, the fluid-delivery device conveys a fuel-air mixture through the catalytic converter to cause a catalytic reaction that heats the catalytic converter to improve a subsequent starting operation of the internal combustion engine.

19. The system of claim 18, wherein the fluid-delivery device comprises the compressor of the turbocharger with the motor configured to drive the compressor during the idle state.

20. The system of claim 18, comprising a bypass line fluidly coupled to the exhaust flow path upstream and downstream of the catalytic converter to bypass the catalytic converter, wherein a valve is disposed along the bypass line.

21. The system of claim 18, wherein the fluid-delivery device comprises the upstream fan positioned upstream of the compressor of the turbocharger and/or the downstream fan positioned downstream of the exhaust-gas turbine.

22. The method according to claim 16, wherein inducing the flow of the fuel-air mixture comprises inducing the flow of the fuel-air mixture with the compressor of the turbocharger with the motor configured to drive the compressor during the idle state.

23. The method according to claim 16, wherein inducing the flow of the fuel-air mixture comprises inducing the flow of the fuel-air mixture with the upstream fan positioned upstream of the compressor of the turbocharger and/or the downstream fan positioned downstream of the exhaust-gas turbine of the turbocharger.

24. A system, comprising:
a catalytic converter configured to be disposed along an exhaust flow path between at least one piston-cylinder unit and an exhaust-gas turbine of an internal combustion engine, wherein the catalytic converter is configured to reduce pollutant emissions in an exhaust gas generated by the at least one piston-cylinder unit;
a fluid-delivery device configured to be fluidly coupled to the exhaust flow path and a supply line via a bypass line, wherein the supply line is configured to supply an intake flow into the at least one piston-cylinder unit of the internal combustion engine, wherein the bypass line is configured to bypass the at least one piston-cylinder unit and allow a bypass flow from the supply line to the exhaust flow path; and
a control device;
wherein the control device is designed to regulate the fluid-delivery device such that, in an idle state of the internal combustion engine in which no combustion and/or ignition occurs in the at least one piston-cylinder unit, the fluid-delivery device induces the bypass flow to convey a fuel-air mixture through the catalytic converter to cause a catalytic reaction that heats the catalytic converter to improve a subsequent starting operation of the internal combustion engine.

25. The system of claim 24, comprising the internal combustion engine.

26. A method, comprising:
supplying a fuel-air mixture to an exhaust flow path between at least one piston-cylinder unit and a catalytic converter of an internal combustion engine during an idle state of the internal combustion engine in which no combustion and/or ignition occurs in the at least one piston-cylinder unit, wherein supplying the fuel-air mixture comprises inducing a flow of the fuel-air mixture through the catalytic converter at least partially via a bypass flow through a bypass line between a supply line and the exhaust flow path, wherein the supply line is configured to supply an intake flow into the at least one piston-cylinder unit of the internal combustion engine, wherein the bypass line is configured to bypass the at least one piston-cylinder unit and allow the bypass flow from the supply line to the exhaust flow path; and heating the catalytic converter via a catalytic reaction with the fuel-air mixture during the idle state to improve a subsequent starting operation of the internal combustion engine, wherein the catalytic converter is configured to reduce pollutant emissions in an exhaust gas generated by the at least one piston-cylinder unit.

* * * * *